(12) United States Patent
Park et al.

(10) Patent No.: US 7,197,426 B2
(45) Date of Patent: Mar. 27, 2007

(54) METHOD AND APPARATUS FOR MEASURING THICKNESS OF METAL LAYER

(75) Inventors: Jang-Ik Park, Suwon-si (KR); Chung-Sam Jun, Suwon-si (KR); Hwan-Shik Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/191,069

(22) Filed: Jul. 28, 2005

(65) Prior Publication Data
US 2006/0052979 A1    Mar. 9, 2006

(30) Foreign Application Priority Data
Aug. 10, 2004    (KR) .................... 10-2004-0062816

(51) Int. Cl.
*G01B 11/28* (2006.01)
(52) U.S. Cl. .................... 702/170; 702/172; 356/630
(58) Field of Classification Search ................ 702/170, 702/171, 172; 356/502, 432, 73, 630, 369, 356/445; 257/431
See application file for complete search history.

(56) References Cited

U.S. PATENT DOCUMENTS

| 4,510,573 | A | 4/1985 | Boyce et al. |
| 5,778,039 | A | 7/1998 | Hossain et al. |
| 6,453,006 | B1 | 9/2002 | Koppel et al. |
| 6,490,047 | B2 * | 12/2002 | Siu ........................... 356/502 |
| 6,633,831 | B2 * | 10/2003 | Nikoonahad et al. ....... 702/155 |
| 6,946,394 | B2 * | 9/2005 | Fielden et al. ............. 438/680 |
| 2002/0103564 | A1 * | 8/2002 | Fielden et al. ............. 700/121 |

FOREIGN PATENT DOCUMENTS

| JP | 2002-124496 | 4/2002 |
| KR | 1020020008859 A | 2/2002 |
| KR | 1020020041260 A | 6/2002 |

* cited by examiner

*Primary Examiner*—John Barlow
*Assistant Examiner*—Hien Vo
(74) *Attorney, Agent, or Firm*—Volentine & Whitt, PLLC

(57) ABSTRACT

In a method and apparatus for measuring a thickness of a metal layer formed on a semiconductor substrate first, second, and third light pulses are successively irradiated onto a top surface of the metal layer to generate respective first, second, and third second sonic waves in the metal layer. Interference between the first and second sonic waves alters a detected reflectivity of the third light pulse off the metal layer. Maximum interference of the sonic waves occurs where the first sonic wave travels to a bottom surface of the metal layer and back to the top surface in the same time that it takes for the second light pulse to arrive at the surface of the metal layer. Accordingly, the velocity of the first sonic wave and a time lag between the first and second light pulses are used to determine the thickness of the metal layer.

20 Claims, 5 Drawing Sheets

METHOD AND APPARATUS FOR MEASURING THICKNESS OF METAL LAYER

BACKGROUND OF THE INVENTION

1. Field of the Invention

The present invention relates generally to a method and apparatus for measuring a thickness of a metal layer. More particularly, the present invention relates to a method and apparatus for measuring a thickness of a metal layer formed on a semiconductor substrate using a laser beam irradiated onto a surface of the metal layer.

A claim of priority is made to Korean Patent Application No. 2004-62816 filed on Aug. 10, 2004, the disclosure of which is hereby incorporated by reference in its entirety.

2. Description of the Related Art

The performance of semiconductor devices is determined, at least in part, by the size and density of processing elements formed on the devices. For example, semiconductor devices with smaller, more densely formed processing elements generally achieve higher performance (e.g., throughput, data access speed, clock rate, etc.) than semiconductor devices having larger, less densely formed processing elements. Accordingly, considerable effort has been invested in developing methods of manufacturing semiconductor devices with smaller, more densely formed processing elements.

The manufacture of modern semiconductor devices typically includes several processing steps including various chemical and/or photographic processing steps, as examples. In the processing steps, various layers are typically formed on a semiconductor substrate and then etched to form processing elements.

In order to decrease the size (i.e., the critical dimension) of the processing elements, it is generally necessary to decrease the thickness of the layers formed on a semiconductor substrate. As the thickness of the layers decreases, an aspect ratio (i.e., width/height) of patterns formed on the substrate tends to increase as well. In addition, as the thickness of the layers decreases, inspection processes used to evaluate characteristics of the layers or patterns formed thereon become increasingly important.

Various devices such as a scanning electron microscope (SEM), a transmission electron microscope (TEM), a secondary ion mass spectrometer (SIMS), an X-ray fluorescence spectroscope (XRF) and an X-ray reflectometer (XRR) have been used to perform inspections on thin layers in the past. For example, U.S. Pat. No. 4,510,573 discloses an XRF, and U.S. Pat. No. 5,778,039 discloses a method and apparatus for inspecting a surface of a semiconductor substrate using the XRF. U.S. Pat. No. 6,453,006 discloses an XRR.

As explained previously, semiconductor devices are typically crated by forming several layers on a semiconductor substrate. In order to avoid producing defects in the semiconductor device, certain characteristics of the layers such as uniformity of doping concentration and thickness need to be carefully regulated. Accordingly, inspection processes are commonly performed to detect defects, irregularities, or non-uniformities on surfaces of the layers.

A titanium nitride layer is commonly utilized as a barrier layer in forming electrical devices such as transistors or capacitors or in forming a metal wiring. The thickness of the titanium nitride layer is generally very small. For example, in a flash memory device, the titanium nitride layer is formed to an even thickness of about 50 Å.

Unfortunately conventional inspection methods and apparatuses fail to properly inspect very thin layers because they lack the required resolution. In other words, they are not precise enough. Accordingly, new inspection methods and apparatuses are needed. In particular, improved methods and apparatuses are needed to inspect metal layers whose thickness is less than that of a dielectric layer formed on the semiconductor substrate.

SUMMARY OF THE INVENTION

According to one embodiment of the invention, a method of measuring a thickness of a metal layer formed on a semiconductor substrate is provided. The method comprises (a) sequentially irradiating a first light pulse, a second light pulse, and a third light pulse onto a top surface of the metal layer, and (b) detecting an intensity of the third light pulse reflected off the top surface of the metal layer. The method further comprises repeating (a) and (b) with a varying time lag between the first and second light pulses to discover a particular value of the time lag producing interference between first and second sonic waves generated in the metal layer by the respective first and second light pulses. The method further comprises determining the thickness of the metal layer using the particular value of the time lag.

According to another embodiment of the present invention, an apparatus adapted to determine a thickness of a metal layer on a semiconductor substrate is provided. The apparatus comprises a light generator adapted to generate first, second, and third light pulses irradiated on a surface of the metal layer, a light receiver adapted to detect an intensity of the third light pulse reflected off the top surface of the metal layer, and a controller adapted to vary a time lag between the first and second light pulses. The method further comprises a determining unit adapted to determine the thickness of the metal layer using a particular value of the time lag producing interference between sonic waves generated in the metal layer by the first and second light pulses.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

Figure (FIG.) 1 is a diagram illustrating an apparatus adapted to measure a thickness of a metal layer formed on a semiconductor substrate according to one embodiment of the invention.

DESCRIPTION OF THE EMBODIMENTS

Exemplary embodiments of the invention are described below with reference to the corresponding drawings. These embodiments are presented as teaching examples. The actual scope of the invention is defined by the claims that follow.

Figure 1:
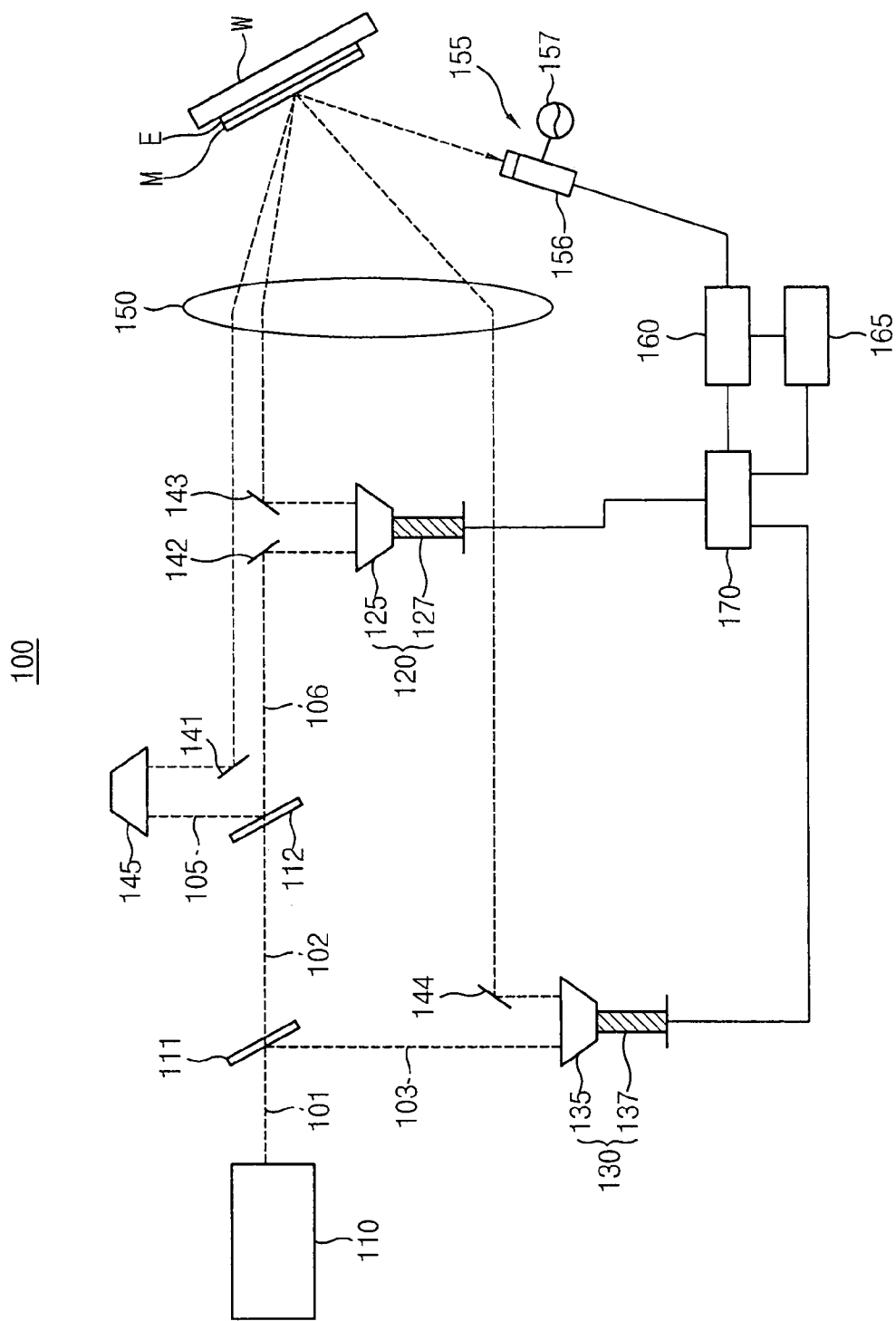

FIG. 1 is a diagram of an apparatus 100 adapted to measure a thickness of a metal layer "M" formed on a semiconductor substrate "W" according to an embodiment of the present invention.

Referring to FIG. 1, apparatus 100 comprises a light source 110, first and second splitters 111 and 112, and first and second path regulators 120 and 130. Apparatus 100 further comprises first through fourth mirrors 141, 142, 143 and 144, a condenser lens unit 150, a light receiver 155, a storage unit 160, a determining unit 165, and a controller 170.

First path regulator 120 typically comprises a first prism 125 and a first driver 127, and second path regulator 130 comprises a second prism 135 and a second driver 137. Apparatus 100 also comprises a third prism 145. Alternatively, another optical element, such as a pair of mirrors, can be used in place of any of first, second, and third prisms 125, 135, and 145. Light receiver 155 comprises a detector 156 and a power supply 157.

Semiconductor substrate "W" is positioned adjacent to condenser lens unit 150. A variety of layers are typically formed on semiconductor substrate "W". For instance, FIG. 1 shows a dielectric layer "E" and metal layer "M" formed on semiconductor substrate "W". In order to measure the thickness of metal layer "M", however, metal layer "M" needs to be exposed to its surroundings. In other words, it should not be covered by another layer. Preferably, semiconductor substrate "W" is inclined at a predetermined angle with respect to condenser lens unit 150 so that light receiver 155 can be positioned to detect a light pulse reflecting off metal layer "M".

Light source 110 generates a source light pulse 101. First splitter 111 is positioned in an optical path of source light pulse 101 to split source light pulse 101 into a preliminary light pulse 102 and a third light pulse 103. Second splitter 112 is positioned in an optical path of preliminary light pulse 102 to split preliminary light pulse 102 into a first light pulse 105 and a second light pulse 106. In sum, source light pulse 101 is split into first, second, and third light pulses 105, 106, and 103 by first and second splitters 111 and 112.

Source light pulse 101 is preferably split into preliminary light pulse 102 and third light pulse 103 such that preliminary light pulse 102 has a luminous flux (hereafter, flux) of about 85 to 95 lumens (lm) and third light pulse 103 has a flux of about 5 to 10 lm. Preliminary light pulse 102 is split into first light pulse 105 and second light pulse 106 such that first light pulse 105 has a flux of about 50 to 60 lm and second light pulse 106 has a flux of about 40 to 60 lm.

The ratio of the fluxes of first, second, and third light pulses 105, 106 and 103 is preferably about 45:45:10. Although the embodiment described above uses first and second splitters 111 and 112 to generate first, second and third light pulses 105, 106 and 103, these light pulses could also be generated by other techniques known to those skilled in the art. For example, first, second and third light pulses 105, 106 and 103 could be generated by independent light sources.

Third prism 145 is positioned in an optical path of first light pulse 105 so as to refract first light pulse 105 at least twice, thereby changing its optical path. First mirror 141 is positioned in the optical path of first light pulse 105 downstream from third prism 145. First mirror 141 reflects light pulse 105 toward condenser lens unit 150.

Second mirror 142 is positioned in an optical path of second light pulse 106 so as to reflect its optical path toward first prism 125. First prism 125 then refracts second light pulse 106 at least twice to change its optical path. Third mirror 143 is positioned in the optical path of second light pulse 106 downstream from first prism 125 to reflect second light pulse 106 toward condenser lens unit 150.

Second prism 135 is positioned in an optical path of third light pulse 103. Second prism 135 refracts third light pulse 103 at least twice to change its optical path. Fourth mirror 144 is positioned in the optical path of third light pulse 103 downstream from second prism 135. Fourth mirror 144 reflects third light pulse 103 toward condenser lens unit 150.

First, second, and third light pulses 105, 106, and 103 are focused at a point on a surface of metal layer "M" through condenser lens unit 150. Preferably, source light pulse 101 has sufficient energy to heat a top surface of metal layer "M", thereby generating a sonic wave from the top surface of metal layer M. Specific properties of source light pulse 101 are chosen based on a particular type of metal layer M. For example, according to one embodiment, source light pulse 101 is chosen to be an ultra-short wave, high-energy laser beam pulse with a pulse width of a few picoseconds.

First prism 125 is supported by first driver 127. First driver 127 is controlled by controller 170 to adjust its location, thereby changing a distance between first prism 125 and second and third mirrors 142 and 143. Changing the distance between first prism 125 and second and third mirrors 142 and 143 alters a distance traveled by second light pulse 106 between second mirror 142 and third mirror 143. As examples, first driver 127 can move first prism 125 away from second and third mirrors 142 and 143 to increase the distance traveled by second light pulse 106. Likewise, first driver 127 can move first prism toward second and third mirrors 142 and 143 to decrease the distance traveled by second light pulse 106.

Second prism 135 is supported by second driver 137. Second driver 137 is controlled by controller 170 to adjust its location, thereby changing a distance between second prism 135 and second and fourth mirror 144. Changing the distance between second prism 135 and fourth mirror 144 alters a distance traveled by third light pulse 103 between first splitter 111 and mirror 144.

Changing the distance traveled by second and third light pulses 106 and 103 causes second and third light pulses 106 and 103 to arrive at condenser lens unit 150 at different times. Accordingly, the relative timing of first, second, and third light pulses 105, 106, and 103 is readily altered by altering the position of first and second prisms 125 and 137 using first and second drivers 127 and 137. A relative time lag "D" between first light pulse 105 and second light pulse 106 is controlled by varying the distance between first prism 125 and second and third mirrors 142 and 143.

First driver 127 may comprise any one of a number of driving units. For example, first driver 127 typically comprises a ball block including a lead screw, a transfer belt, and a stepper motor. An exemplary stepper motor is described briefly below.

The stepper motor is characterized by a precisely controlled revolution speed and revolution angle. The revolution angle of the stepper motor is proportional to a total number of light pulses that have passed through first prism 125 and the revolution speed of the stepper motor is proportional to a number of light pulses passing through first prism 125 each second. In other words, for each light pulse that passes through first prism 125, the stepper motor rotates (i.e., steps) by a predetermined amount to increment the revolution angle. Hence, the cumulative revolution angle of the stepper motor is determined by the number of times that the revolution angle has been incremented and the revolution speed of the stepper motor is determined by the frequency of the increments. An error in the revolution angle is typically less than about 0.05° per step. However, the error is not accumulated with every step of the stepper motor.

The stepper motor requires no feedback to detect the revolution angle and it is operated in a relatively simple way. For instance, where source light pulse 101 has a pulse width of about 0.2 picoseconds and a velocity of about $3\times10^8$ m/s, the distance across source light pulse 101 is about 0.06 mm. The distance across source light pulse 101 is calculated by multiplying its velocity by its pulse width. In this case, the stepper motor is controlled in such a way that the revolution angle is incremented by about 0.06 mm, i.e., substantially the same as the distance across source light pulse 101 each time a light pulse passes through first prism 125.

Preferably, first driver 127 includes a stepper motor having a radius of revolution in a range from about a few to a few dozen micrometers (μm). However, the revolution radius of the stepper motor can vary. In addition, first driver 127 may comprise any of various other driving means in accordance with time lag "D" between first light pulse 105 and second light pulse 106.

Second driver 137 is substantially the same as first driver 127. Accordingly, further description of second driver 137 is omitted to avoid redundancy. However, it should be noted that other means of changing the distance between second prism 135 and fourth mirror 144 may be used in place of second driver 137.

Figure 2:
FIGS. 2 through 5 are signal diagrams showing relative intensities and timings for light pulses shown in FIG. 1.
Figure 3:
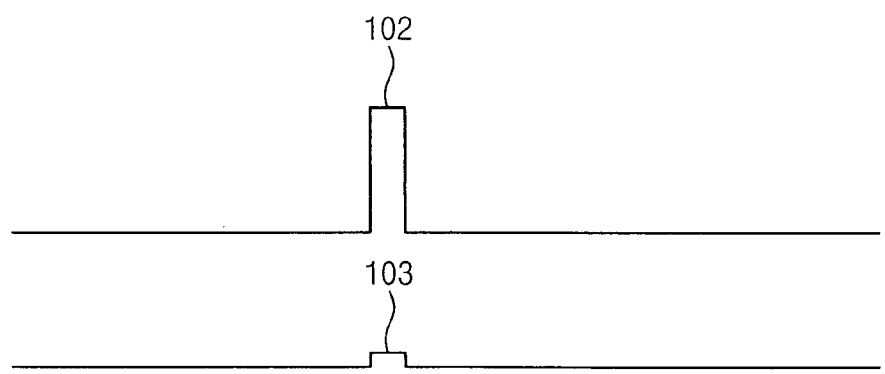
Figure 4:
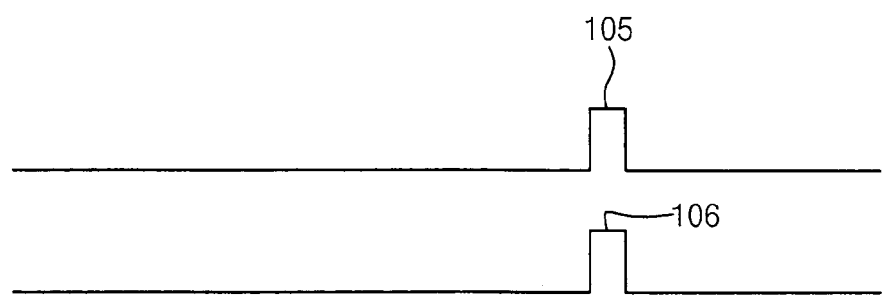
Figure 5:
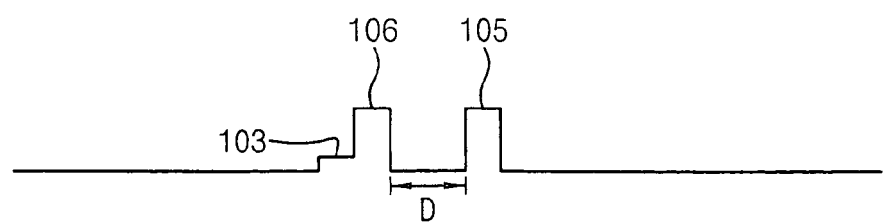

FIGS. 2 through 5 are signal diagrams showing relative intensities and timings for light pulses contained in the light s shown in FIG. 1. In particular, FIG. 2 is a diagram of source light pulse 101, FIG. 3 is a diagram of preliminary light pulse 102 and third light pulse 103, FIG. 4 is a diagram of first and second light pulses 105 and 106, and FIG. 5 is a diagram of first, second, and third light pulses 105, 106, and 103 after being reflected by respective first, third, and fourth mirrors 141, 143, and 144. As seen in FIGS. 2 through 5, the intensity (i.e., amplitude) of source light pulse 101 is roughly equal to a sum of the intensities of preliminary light pulse 102 and third light pulse 103. The intensity of preliminary light pulse 102 is roughly equal to a sum of the intensities of first light pulse 105 and second light pulse 106.

First, second and third light pulses 105, 106 and 103 shown in FIG. 5 are sequentially irradiated onto the top surface of metal layer "M". Second light pulse 106 is irradiated onto metal layer "M" following a predetermined time lag "D" after first light pulse 105 is irradiated onto metal layer "M". Third light pulse 103 is irradiated onto the top surface of metal layer "M" immediately after second light pulse 106. Time lag "D" between first and second light pulses 105 and 106 is determined by a pulse width of source light pulse 101. For example, where source light pulse 101 has pulse width of 0.2 picoseconds, time lag "D" between first and second light pulses 105 and 106 is controlled to be more than about 0.2 picoseconds.

Figure 6:
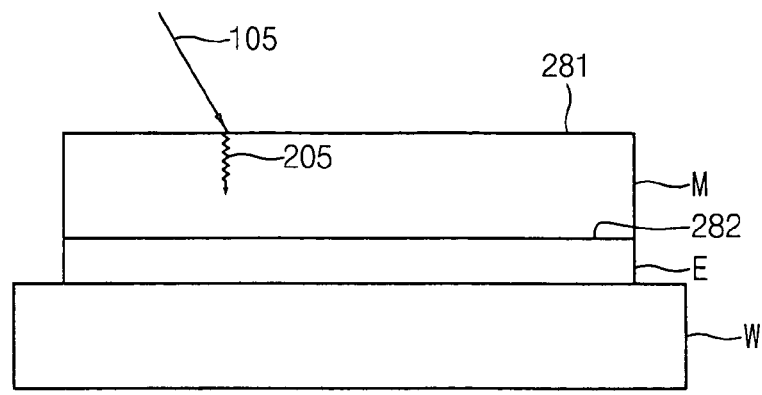
FIG. 6 is a diagram showing a first sonic wave generated in a metal layer by a first light pulse.
Figure 7:
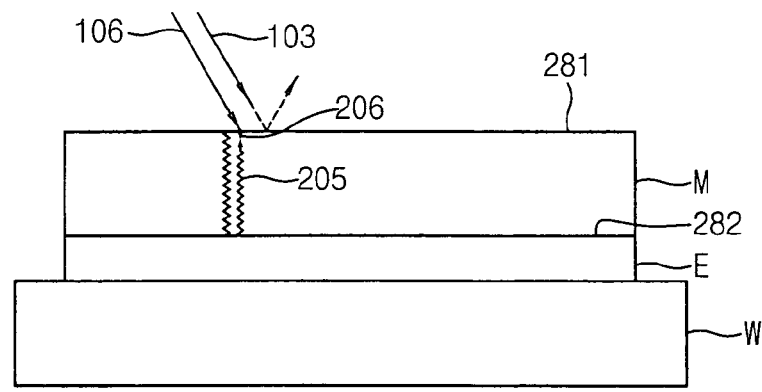
FIG. 7 is a diagram showing destructive interference generated by interaction between first and second sonic waves in a metal layer.
Figure 8:
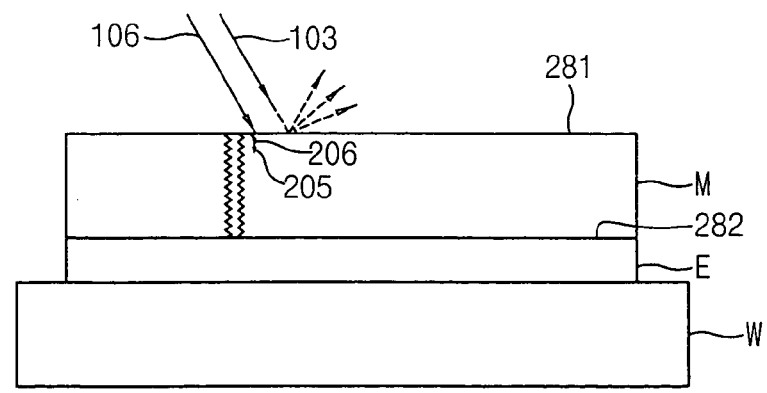
FIG. 8 is a diagram showing constructive interference generated by interaction between first and second sonic waves in a metal layer.

FIGS. 6 through 8 illustrate interactions between first through third light pulses 105, 106, and 103, and metal layer "M". As shown in FIGS. 6 through 8, metal layer "M" is formed on a dielectric layer "E", which is formed on a semiconductor substrate "W". Metal layer "M" has a top surface 281 and a bottom surface 282.

Referring to FIG. 6, where first light pulse 105 is irradiated onto top surface 281, heat is generated on metal layer "M". The heat causes molecular distances between molecules in metal layer "M" to increase. Due to the increase of the molecular distances in metal layer "M", a first sonic wave 205 is generated in an upper portion of metal layer "M" near top surface 281.

Referring to FIG. 7, where second light pulse 106 is irradiated onto top surface 281, additional heat is generated on metal layer "M". The additional heat causes molecular distances between molecules in metal layer "M" to increase, causing a second sonic wave 206 to be generated in an upper portion of metal layer "M".

Similarly, where third light pulse 103 is irradiated onto top surface 281, a third sonic wave is generated at an upper portion of metal layer "M" due to variations in the molecular distances of metal layer "M" caused by heat generated by third light pulse 103. However, the intensity of third light pulse 103 is lower than that of first and second light pulses 105 and 106, and as a result, the intensity of the third sonic wave is much lower than that of first and second sonic waves 205 and 206. Accordingly, in at least one embodiment of the invention, the third sonic wave is not considered when measuring the thickness of metal layer "M". Instead, third light pulse 103 is only used for measuring molecular vibrations on top surface 281.

Light receiver 155 is located at a position facilitating the detection of third light pulse 103 reflected from top surface 281. Light receiver 155 is preferably positioned in a space between condenser lens unit 150 and semiconductor substrate "W" and inclined at an angle with respect to the condenser lens unit 150.

First and second light pulses 105 and 106 are also reflected from surface 281 of metal layer "M". However, light receiver 155 is positioned in such a way that third light pulse 103 is detected and first and second light pulses 105 and 106 are not detected. This can be explained as follows.

First, second and third light pulses 105, 106 and 103 are irradiated onto different points on a surface of condenser lens unit 150. The different points are positioned along the circumference of a circle whose center is coincident with a center of condenser lens unit 150 and whose size is less than that of condenser lens unit 150. Although first, second, and third light pulses 105, 106, and 103 irradiate onto different points of condenser lens unit 150, first, second and third light s 105, 106 and 103 are irradiated onto a common point on top surface 281 of metal layer "M" after passing through condenser lens unit 150. First, second, and third light pulses 105, 106 and 103 are each reflected from surface 281 of the metal layer "M" in different directions due to the inclination of semiconductor substrate "W" with respect to condenser lens unit 150. Accordingly, third light pulse 103 travels on a different optical path from first and second light pulses 105 and 106 after reflecting off of metal layer "M". Light receiver 155 is positioned in the optical path of third light pulse 103, and therefore, third light pulse 103 is detected by light receiver 155.

As explained previously, light receiver 155 comprises a detector 156 and a power supply 157. Detector 156 detects third light pulse 103 after it is reflected off metal layer "M" and power supply 157 supplies power to detector 156.

Detector 156 measures the intensity third light pulse 103 after it is reflected off metal layer "M". The measured intensity is then transformed into an electrical signal. In other words, the intensity of third light pulse 103 is transformed into a voltage proportional to the intensity of third light pulse 103.

Figure 9:
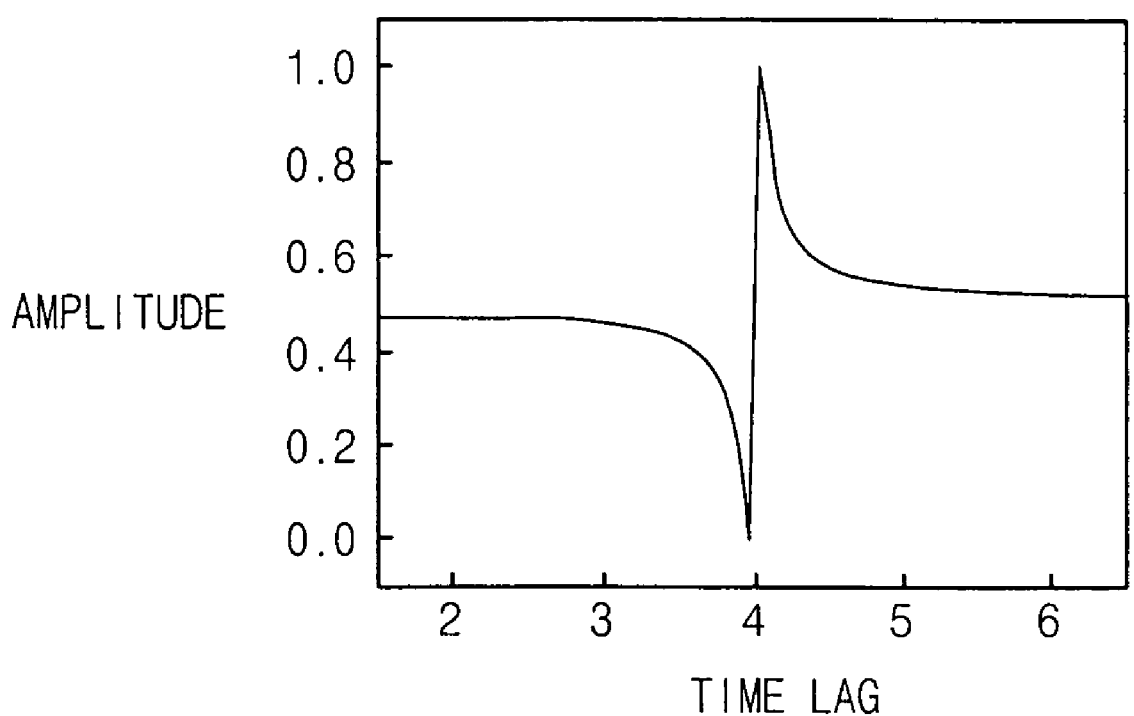
FIG. 9 is a graph showing relative amplitudes of molecular vibrations on a top surface of a metal layer as a function of a lag time between first and second light pulses irradiated on the top surface; and, FIG. 10 is a flow chart illustrating a method of measuring a thickness of a metal layer formed on a semiconductor substrate according to an embodiment of the present invention.

A ratio of the intensity of third light pulse 103 before and after it is reflected off metal layer "M" provides a measure of a reflectivity of metal layer "M". Detector 156 calculates the reflectivity of metal layer "M" by comparing the intensity of third light pulse 103 after it is reflected from top surface 281 of metal layer "M" with the intensity of third light pulse 103 before it is reflected from top surface 281. The reflectivity of metal layer "M" is stored in storage unit 160 as digital data.

Where molecular vibrations in metal layer "M" are severe due to foreign turbulence, the reflectivity of metal layer "M" becomes low and most of third light pulse 103 is scattered on, rather than reflected from top surface 281 of metal layer "M", as illustrated in FIG. 9. In contrast, where molecular vibrations in metal layer "M" are relatively small, the reflectivity of metal layer "M" becomes relatively high and most of third light pulse 103 is reflected rather than scattered by top surface 281 of metal layer "M".

The reflectivity of metal layer "M" stored in storage unit 160 is transferred into determining unit 165, and determining unit 165 determines whether or not the reflectivity is within a predetermined error range. Where the reflectivity is out of the predetermined error range, controller 170 controls first path regulator 120 to vary the distance between first prism 125 and second and third mirrors 142 and 143 in accordance with a preset program. Accordingly, time lag "D" between the first light pulse 105 and second light pulse 106 is changed as the interval is varied. At the same time, controller 170 also controls second path regulator 130 based on time lag "D".

Where the reflectivity of metal layer "M" is within the predetermined error range, determining unit 165 determines the thickness of metal layer "M" using the following equation (1):

$$t = \frac{D \times v}{2} \quad (1)$$

In equation (1), "t" denotes the thickness of metal layer "M", "D" denotes a particular value of time lag "D" between first light pulse 105 and second light pulse 106, and "v" denotes a velocity of first sonic wave 205. Intuitively, equation (1) can be understood as follows. Sonic waves 205 and 206 experience significant interference where first sonic wave 205 travels to bottom surface 282 of metal layer "M" and then back to top surface 281 of metal layer "M" before second light pulse 106 irradiates top surface 281 of metal layer "M". In other words, significant interference occurs where first sonic wave 205 travels a distance of 2t in a time period "D". Hence, 2t=D×v, as indicated by equation (1).

Time lag "D" between first light pulse 105 and second light pulse 106 is preferably larger than a pulse width of a the first and second light pulses 105 and 106. For example, where first and second light pulses 105 and 106 each have pulse width of about 0.2 picoseconds, time lag "D" is preferably more than 0.2 picoseconds.

First and second light pulses 105 and 106 have a resolution capable of measuring the thickness of a thin metal layer "M". In general, the resolution of a light pulse (i.e., the size of the smallest feature that can be reliably measured by the light) is calculated by the following equation (2):

$$R = \frac{w \times v}{2} \quad (2)$$

In equation (2), "R" denotes a resolution of a light pulse, "w" denotes a pulse width of a light pulse, and "v" denotes a velocity of the light pulse. For example, where a laser beam containing a light pulse with a pulse width of about 0.2 picoseconds travels at a velocity of about 5000 m/s, the resolution of the light pulse is about 5 mm according to equation (2). Accordingly, where the thickness of metal layer "M" is expected to be less than about 5 mm, a light pulse in the laser beam can have a pulse width no more than about 0.2 picoseconds. In other words, in order to accurately measure the thickness of metal layer "M", source light pulse 101 needs to have a pulse width smaller than a thickness of metal layer "M".

As previously, mentioned, first light pulse 105 typically has a flux of about 50 to 60 lm and second light pulse 106 typically has a flux of about 40 to 60 lm. Preferably, first light pulse 105 has the same flux as second light pulse 106.

Where first light pulse 105 is irradiated onto top surface 281 of metal layer M, top surface 281 of metal layer "M" is heated up. As a result, molecules in an upper portion of metal layer "M" are excited and intermolecular distances are increased. The molecules collide with each other and vibrate in the upper portion of metal layer "M", creating sonic wave 205 therein. In a similar fashion, second sonic wave 206 is generated in the upper portion of metal layer "M" due to molecular vibrations caused by second light pulse 106.

First sonic wave 205 passes through an inside of metal layer "M", and is reflected at bottom surface 282 of metal layer "M", where metal layer "M" makes contact with dielectric layer "E". First sonic wave 205 reflected by bottom surface 282 of metal layer "M" is referred to hereafter as a bottom-reflected first sonic wave 205. First sonic wave 205 is reflected by bottom surface 282 because dielectric layer "E" has a different density from metal layer "M". In general, dielectric layer "E" could be replaced with another layer having a different density from metal layer "M".

Since second light pulse 106 irradiates metal layer "M" after time lag "D", second sonic wave 206 travels down through metal layer "M" while bottom-reflected first sonic wave 205 travels up through metal layer "M". Accordingly, sonic wave 206 meets with bottom-reflected first sonic wave 206 to create constructive or destructive interference.

Where sonic waves 205 and 206 interfere with each other constructively, the molecules in metal layer "M" vibrate more severely than without the interference. In contrast, where waves 205 and 206 interfere with each other destructively, the in metal layer "M" vibrate less frequently than without the interference. Interference occurring between first and second sonic waves 205 and 206 is described in further detail hereafter.

As shown in FIG. 7, second sonic wave 206 passes through metal layer "M" in a direction opposite to that of bottom-reflected first sonic wave 205. As a result, where an intensity (i.e., an amplitude) of second sonic wave 206 is substantially the same as that of first sonic wave 205 and a phase of second sonic wave 206 is substantially opposite that of bottom-reflected first sonic wave 205, bottom reflected first sonic wave 205 and second sonic wave 206 interfere destructively so that the molecular vibrations at the top surface portion of the metal layer "M" are remarkably diminished.

In order to form second wave 206 with the same intensity as first wave 205, second light pulse 106 is required to have about the same flux as first light pulse 105. Because wave energy of first sonic wave 205 is gradually dissipated as first sonic wave 205 passes through metal layer "M", second light pulse 106 is theoretically required to have slightly less flux than first light pulse 105 in order for perfect destructive interference to occur between first and second sonic waves 205 and 206. However, in practice, the dissipated wave energy dissipation of first sonic wave 205 is insignificant because the thickness of metal layer "M" is very small. Accordingly, setting second light pulse 106 to have the same flux as first light pulse 105 is sufficient to cause destructive interference between bottom-reflected first sonic wave 205 and second sonic wave 206.

After reflecting from bottom surface 282 of metal layer "M" and reaching top surface 281, first sonic wave 205 is again reflected from top surface 281 of metal layer "M" and passes through metal layer "M" due to a density difference between metal layer "M" and its surroundings. First sonic wave 205 reflected from top surface 281 of metal layer "M" after reflecting from bottom surface 282 is referred to hereafter as a top-reflected first sonic wave 205, in contrast to bottom-reflected first sonic wave 205. As shown in FIG. 9, second sonic wave 206 passes in the same direction as top-reflected first sonic wave 205 to create constructive interference. As a result, molecular vibrations in metal layer "M" are remarkably reinforced.

Where third light pulse 103 is irradiated onto top surface 281 of metal layer "M" at the same time that bottom-reflected first sonic wave 205 and second sonic wave 206 cancel each other out due to destructive interference, a detected reflectivity of third light pulse 103 measured by detector 156 is remarkably high. In contrast, where third light pulse 103 is irradiated onto the top surface of the metal layer "M" at the time that top-reflected first sonic wave 205 and second sonic wave 206 are added to each other due to the constructive interference, the detected reflectivity of third light pulse 103 is remarkably low. Accordingly, a wide deviation in the detected reflectivity of third light pulse 103 from a baseline reflectivity indicates that first and second sonic waves 205 and 206 interfere with each other constructively or destructively in metal layer "M".

The baseline reflectivity is defined as a reflectivity measured by detector 156 while third light pulse 103 is irradiated onto top surface 281 and first sonic wave 205 passes through the inside of metal layer "M". In other words, the baseline reflectivity is defined as a reflectivity measured while first and second sonic waves 205 and 206 do not interfere with each other.

Where the detected reflectivity of third light pulse 103 deviates significantly from the standard reflectivity, bottom-reflected first sonic wave 205 or top-reflected first sonic wave 205 is interfering with second sonic wave 206 and time lag "D" between first light pulse 105 and second light pulse 106 corresponds substantially to the time for first sonic wave 205 to go to bottom surface 282 and return to top surface 281 of metal layer "M". The thickness of metal layer "M" can therefore be calculated by the following equation (3):

$$t = \frac{vD}{2} \quad (3)$$

In equation (3), "t" denotes the thickness of metal layer "M", "v" denotes the velocity of first sonic wave 205, and "D" denotes time lag "D" between first light pulse 105 and second light pulse 106. The velocity of first sonic wave 205 can vary significantly depending on a kind of the metal layer "M" and its physical properties.

An exemplary method of measuring the thickness of metal layer "M" is described below with reference to FIG. 9.

Referring to FIG. 9, the amplitude of molecular vibrations is graphed for values of time lag "D" ranging between one picosecond and six picoseconds. The amplitude of the molecular vibrations is shown in relative units in the graph.

Where time lag "D" is about 4 picoseconds, the amplitude of the molecular vibrations is remarkably increased from zero to about one. The remarkable increase of the molecular vibration amplitude indicates that first and second sonic waves 205 and 206 interfere with each other at top surface 281 of metal layer "M".

In this example, the velocity of first sonic wave 205 is about 5000 m/s and time lag "D" is about 4 picoseconds. Using equation (3), the thickness of metal layer "M" is calculated to be about 100 Å. Where time lag "D" is about 3.99 picoseconds, the amplitude of the molecular vibration is relatively small, and where time lag "D" is about 4.01 picoseconds, the amplitude of the molecular vibration is relatively large. Hence, a practical difference of about 0.02 picoseconds exists between values of time lag "D" resulting in minimum and maximum amplitudes of molecular vibrations.

Since the difference between time lags "D" resulting in the minimum and maximum amplitudes of molecular vibration is so small, the thickness of metal layer "M" can be measured using the time lag "D" corresponding to the minimum or maximum amplitude without significantly impairing the accuracy of the thickness measurement of metal layer "M". However, measuring the thickness of metal layer "M" using lag time "D" between the minimum and maximum amplitudes of molecular vibrations tends to increase the accuracy of the measurement.

While the above described exemplary embodiment discloses time lag "D" in a range between 1 and 6 picoseconds, time lag "D" preferably varies from about −10% to about +10% of a critical time lag "D". The critical time lag "D" is a value of time lag "D" at which molecular vibrations at the surface of metal layer "M" vary between the minimum point and a maximum point.

As described above, changing the distance traveled by second light pulse 106 varies time lag "D", and changing the distance traveled by third light pulse 103 ensures irradiation of third light pulse 103 onto top surface 281 of metal layer "M" immediately after irradiation by second light pulse 106.

Figure 10:
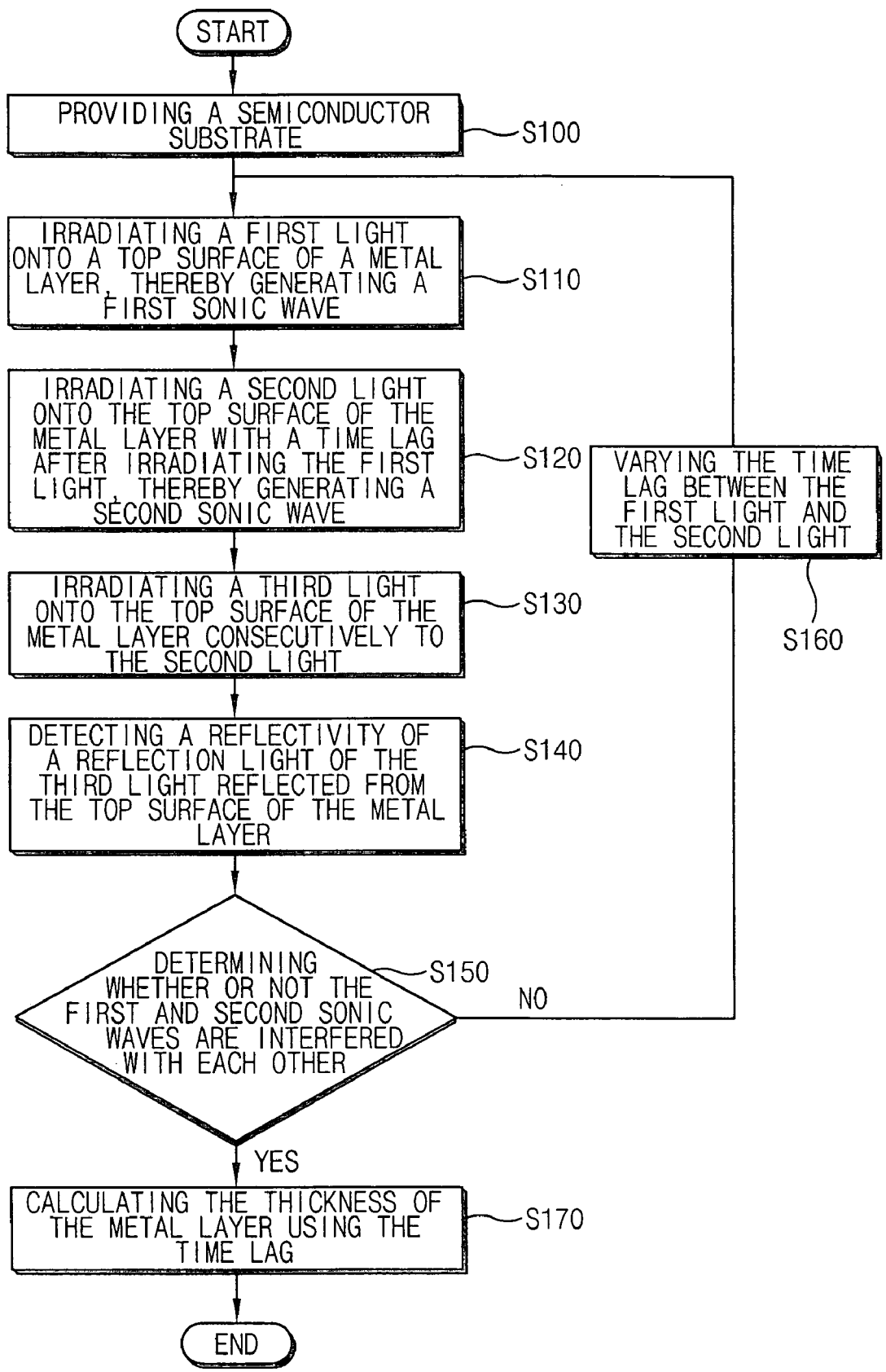

FIG. 10 is a flow chart illustrating a method of measuring a thickness of a metal layer formed on a semiconductor substrate according to one embodiment of the invention. In this written description, method steps are designated by parentheses (Sxxx) to distinguish them from exemplary device or apparatus elements.

Referring to FIG. 1, semiconductor substrate "W" is provided to apparatus 100 to measure the thickness of metal layer "M" formed thereon (S100). First light pulse 105 is irradiated onto top surface 281 of metal layer "M", so that first sonic wave 205 is generated in the upper portion of metal layer "M" (step S110). Second light pulse 106 is irradiated onto top surface 281 of metal layer "M" following a predetermined time lag "D" after first light pulse 105 is irradiated on surface 281. The irradiation of second light pulse 106 causes a second sonic wave 206 to be generated in the upper portion of metal layer "M" (step S120).

Third light pulse 103 is irradiated onto top surface 281 of metal layer "M" (step S130). Third light pulse 103 is reflected off of metal layer "M" and detected by detector 156. Detector 156 calculates a reflectivity of metal layer "M" (step S140) based on detected third light pulse 103. The reflectivity is then stored as digital data in storage unit 160.

Determining unit 165 determines whether or not first and second sonic waves 205 and 206 interfere with each other in the upper portion of metal layer "M" (step S150). Time lag "D" is varied by changing the position of first driver 127 until first and second sonic waves 205 and 206 interfere with each other. Where first and second sonic waves 205 and 206 interfere with each other constructively or destructively, determining unit 165 calculates the thickness of metal layer "M" (step S170) using time lag "D" between first light pulse 105 and second light pulse 106.

Where first and second sonic waves 205 and 206 do not interfere with each other, controller 170 controls first path regulator 120 to change the distance between first prism 125 and second and third mirrors 142 and 143, thereby varying time lag "D" between first light pulse 105 and second light pulse 106. Thereafter, steps S110, S120, S130, S140 and S150 are repeated until first and second sonic waves 205 and 206 interfere with each other.

According to the embodiments of the present invention described above, constructively or destructively interfering sonic waves are generated in a metal layer by varying a time lag between light s used to generate the sonic waves. Lag times generating minimally and maximally interfering sonic waves in the metal layer are then used to calculate the thickness of the metal layer. Using the methods and apparatus described above, precise and reliable measurements can be made.

The foregoing preferred embodiments are teaching examples. Those of ordinary skill in the art will understand that various changes in form and details may be made to the exemplary embodiments without departing from the scope of the present invention which is defined by the following claims.

What is claimed:

1. A method of measuring thickness of a metal layer formed on a semiconductor substrate, the method comprising:
   (a) sequentially irradiating a surface of the metal layer with a first light pulse to generate a first sonic wave in the metal layer, a second light pulse to generate a second sonic wave in the metal layer, and a third light pulse;
   (b) detecting intensity of a reflected portion of the third light pulse;
   repeating (a) and (b) with a time lag between irradiation of the first and second light pulses;
   determining a time lag value producing interference between the first and second sonic waves; and,
   determining the thickness of the metal layer in relation to the time lag value.

2. The method of claim 1, wherein irradiating the first, second and third light pulses onto the surface of the metal layer comprises:

irradiating the surface of the metal layer with the first light pulse;
thereafter, irradiating the surface of the metal layer with the second light pulse following the time lag; and,
immediately after irradiating the surface of the metal layer with the second light pulse, irradiating the surface of the metal layer with the third light pulse.

3. The method of claim 2, wherein the time lag between the first light pulse and the second light pulse is varied by changing the respective optical paths associated with the first and second light pulses.

4. The method of claim 2, wherein the third light pulse is controlled to irradiate on the surface of the metal layer immediately after the second light pulse by changing the respective optical paths associated with the second and third light pulses.

5. The method of claim 1, wherein the first and second light pulses are produced by a laser beam.

6. The method of claim 1, wherein the interference between first and second sonic waves comprises destructive interference.

7. The method of claim 1, wherein the interference between first and second sonic waves comprises constructive interference.

8. The method of claim 1, wherein the thickness of the metal layer is determined by the equation:

$$t = \frac{D \times v}{2}$$

wherein, "t" denotes the thickness of the metal layer, "v" denotes a velocity of the first sonic wave, and "D" denotes the time lag value.

9. An apparatus adapted to determine a thickness of a metal layer on a semiconductor substrate, the apparatus comprising:
   a light generator adapted to irradiate a surface of the metal layer with first, second, and third light pulses;
   a light receiver adapted to detect a portion of the third light pulse reflected from the surface of the metal layer;
   a controller adapted to vary a time lag between the first and second light pulses; and,
   a determining unit adapted to determine the thickness of the metal layer using a time lag value corresponding to interference between respective sonic waves generated in the metal layer by the first and second light pulses.

10. The apparatus of claim 9, wherein the light generator comprises a laser beam.

11. The apparatus of claim 9, wherein the light generator comprises:
   a light source adapted to generate a source light pulse;
   a first splitter adapted to split the source light pulse into a preliminary light pulse and the third light pulse;
   a second splitter adapted to split the preliminary light pulse into the first light pulse and the second light pulse;
   a first path regulator adapted to define a second optical path associated with the second light pulse, wherein the surface of the metal layer is irradiated with the second light pulse following a time lag with respect to the first light pulse; and,
   a second path regulator adapted to define a third optical path associated with the third light pulse, wherein the surface of the metal layer is irradiated by the third light pulse immediately after the second light pulse.

12. The apparatus of claim 11, wherein the first path regulator comprises:
   an optical element placed in the second optical path; and,
   a driving unit adapted to adjust a position of the optical element to vary the second optical path.

13. The apparatus of claim 11, wherein the second path regulator includes:
   an optical element placed in the third optical path; and,
   a driving unit adapted to adjust a position of the optical element to vary the third optical path.

14. The apparatus of claim 12, wherein the optical element comprises a prism.

15. The apparatus of claim 13, wherein the optical element comprises a prism.

16. The apparatus of claim 9, wherein the light receiver comprises:
   a detector adapted to detect the intensity of the reflected portion of the third light pulse; and,
   a power supply adapted to provide power to the detector.

17. The apparatus of claim 9, further comprising:
   a storage unit adapted to store a value associated with the intensity of the reflected portion of the third light pulse and a baseline intensity value.

18. The apparatus of claim 9, wherein the light generator comprises:
   three independent light sources respectively generating the first, second, and third light pulses.

19. The apparatus of claim 11, further comprising:
   a prism located in a first optical path downstream from the second splitter;
   a first mirror located in the first optical path downstream from the prism;
   a second mirror located in the second optical path downstream from the second splitter;
   a third mirror located in the second optical path downstream from the first path regulator;
   a fourth mirror located in the third optical path downstream from the second path regulator; and,
   a condenser lens unit located between the first through fourth mirrors and the semiconductor substrate.

20. The apparatus of claim 19, wherein each of the first and second path regulators comprises:
   a prism; and,
   a driver comprising a stepper motor.

* * * * *